US012403790B2

(12) United States Patent
Statezni et al.

(10) Patent No.: US 12,403,790 B2
(45) Date of Patent: Sep. 2, 2025

(54) ANTENNA ON CHARGER INFRASTRUCTURE

(71) Applicant: Waymo LLC, Mountain View, CA (US)

(72) Inventors: Dieter Statezni, Cupertino, CA (US); Sangram Patil, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 302 days.

(21) Appl. No.: 17/644,365

(22) Filed: Dec. 15, 2021

(65) Prior Publication Data

US 2022/0185140 A1 Jun. 16, 2022

Related U.S. Application Data

(60) Provisional application No. 63/126,261, filed on Dec. 16, 2020.

(51) Int. Cl.
*G01C 21/34* (2006.01)
*B60L 53/66* (2019.01)
(Continued)

(52) U.S. Cl.
CPC ............... *B60L 53/66* (2019.02); *B60L 58/12* (2019.02); *B60W 60/001* (2020.02);
(Continued)

(58) Field of Classification Search
CPC ........... B60L 2240/72; B60L 2240/622; B60L 2250/26; B60L 2260/32; B60L 53/14;
(Continued)

(56) References Cited

U.S. PATENT DOCUMENTS 9,931,952 B2 4/2018 Tripathi et al.
10,449,872 B2 10/2019 Sullivan et al.
(Continued)

FOREIGN PATENT DOCUMENTS

CN 106864282 6/2017
CN 107323301 11/2017
(Continued)

OTHER PUBLICATIONS

Bernhard Walzel, et al., "Automated robot-based charging system for electric vehicles," Institute of Automative Engineering, Apr. 28, 2016.

(Continued)

*Primary Examiner* — Charles J Han
(74) *Attorney, Agent, or Firm* — McDonnell Boehnen Hulbert & Berghoff LLP

(57) ABSTRACT

Example embodiments described herein involve a system including a high throughput signal transmitter adjacent to a charging port of an autonomous vehicle configured to transmit information to a high throughput signal receiver. The high throughput signal receiver may be positioned on an electrical charging apparatus. Further, the high throughput signal transmitter and the high throughput signal receiver may be in point to point communication. Finally, the high throughput signal transmitter and the high throughput signal receiver may be separated by a distance up to and including 1.5 meters.

14 Claims, 9 Drawing Sheets

(51) Int. Cl.
*B60L 58/12* (2019.01)
*B60W 60/00* (2020.01)
*H01Q 9/04* (2006.01)
*H02J 7/00* (2006.01)
*H04B 7/06* (2006.01)
*H04L 43/0876* (2022.01)

(52) U.S. Cl.
CPC ....... *G01C 21/3407* (2013.01); *H01Q 9/0407* (2013.01); *H02J 7/00032* (2020.01); *H02J 7/0045* (2013.01); *H02J 7/0048* (2020.01); *H04B 7/0617* (2013.01); *H04L 43/0876* (2013.01); *B60W 2420/403* (2013.01); *B60W 2420/408* (2024.01)

(58) Field of Classification Search
CPC .......... B60L 53/36; B60L 53/66; B60L 58/12; B60W 2420/403; B60W 2420/408; B60W 2510/244; B60W 2756/10; B60W 60/001; G01C 21/3407; G01C 21/3469; H01Q 9/0407; H02J 50/23; H02J 50/27; H02J 7/00032; H02J 7/0042; H02J 7/0045; H02J 7/0048; H04B 7/0617
See application file for complete search history.

(56) References Cited

U.S. PATENT DOCUMENTS

| | | | |
|---|---|---|---|
| 10,493,855 B2 | 12/2019 | Chase et al. | |
| 10,743,308 B2 | 8/2020 | Sai | |
| 11,511,640 B1* | 11/2022 | Laskar | .................. H04W 4/023 |
| 2017/0050749 A1 | 2/2017 | Pilskalns | |
| 2018/0304759 A1 | 10/2018 | Chase | |
| 2018/0370377 A1 | 12/2018 | Blacksberg et al. | |
| 2018/0375390 A1* | 12/2018 | Sieber | ..................... B60L 53/22 |

FOREIGN PATENT DOCUMENTS

| | | |
|---|---|---|
| CN | 104852475 | 12/2017 |
| CN | 109347159 | 2/2019 |
| CN | 109596138 A | 4/2019 |
| CN | 110281806 | 9/2019 |
| CN | 110398953 A | 11/2019 |
| CN | 110957818 | 4/2020 |
| CN | 111982109 A | 11/2020 |
| KR | 101856101 | 5/2018 |
| WO | WO2019135409 | 7/2019 |

OTHER PUBLICATIONS

"e-smartConnect: Volkswagen is conducting research on an automated quick-charging system for the next generation of electric vehicles," Wolfsburg / Technology / Press Release, Jul. 13, 2015, printed from the World Wide Web.

Makoto Ogihara, et al., "Wireless Power and Data Transfer System for Station-Based Autonomous Underwater Vehicles," Oceans 2015—MTS/IEE Washington, 2015, pp. 1-5.

* cited by examiner

ANTENNA ON CHARGER INFRASTRUCTURE

CROSS-REFERENCE TO RELATED APPLICATIONS

This application claims priority to U.S. provisional patent application No. 63/126,261, filed Dec. 16, 2020, which is hereby incorporated by reference in its entirety.

BACKGROUND

Unless otherwise indicated herein, the materials described in this section are not prior art to the claims in this application and are not admitted to be prior art by inclusion in this section.

During operation, an autonomous vehicle may gather data pertaining to its surroundings. The data may be gathered constantly during operation. Data gathered during operation can reach up to multiple terabytes. The data may be temporarily stored in the autonomous vehicle while the vehicle is in operation. After operation, the data may eventually be offloaded from the autonomous vehicle. Conventional data transfer techniques may include a hardwire connection, such as a coaxial or Ethernet cable, from a hard drive of the autonomous vehicle to a local data base. From the database, the data may also be uploaded to a cloud-based storage drive. An additional technique may be to remove the hard drive from the vehicle to download the information at a different location.

SUMMARY

The present disclosure generally relates to wirelessly transferring data from an autonomous vehicle to a cloud-based storage drive while the autonomous vehicle is being charged. Particularly, the autonomous vehicle may include at least a pair of antennas for transmitting and receiving data packets from the autonomous vehicle.

In one aspect, the present application describes a system for wirelessly transferring data. The system may include a high throughput signal transmitter adjacent to a charging port of the autonomous vehicle configured to transmit information to a high throughput signal receiver positioned on an electrical charging apparatus. The system may also include the high throughput signal transmitter and the high throughput signal receiver in point to point communication with each other. Further, the system may include that the high throughput signal transmitter and the high throughput signal receiver are separated by a distance up to and including 1.5 meters.

In another aspect, the present application describes a method of wirelessly transferring data from an autonomous vehicle. The method may involve establishing a connection between a signal transmitter of the autonomous vehicle and a signal receiver. The signal transmitter may be positioned adjacent to the charging port and the signal receiver may be positioned on the electrical charging apparatus. The method may also involve transferring information from the signal transmitter to the signal receiver. Transferring information may be performed for the duration of charging of the autonomous vehicle.

In an additional aspect, the present invention describes a method for operating an electric or hybrid vehicle. The method may involve generating data pertaining to a surrounding of an electric or hybrid vehicle, where the data is generated using at least one of a lidar, radar, or camera. The method can also include, based on a quantity of data generated, navigating the vehicle to a battery charging station. The method can additionally include charging the battery of the vehicle.

In another aspect, the present invention describes a method for operating an electric or hybrid vehicle. The method may involve generating data pertaining to a surrounding of an electric or hybrid vehicle, where the data is generated using at least one of a lidar, radar, or camera. In addition the method can include detecting a charging level of a battery of the vehicle. The method can also include, based on the charging level, navigating the vehicle to a battery charging station having a data signal receiver. The method can further include transmitting data from a data signal transmitter of the vehicle to the data signal receiver of the battery charging location.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

Example embodiments should become apparent from the following description, which is given by way of example only, of at least one preferred but non-limiting embodiment, described in connection with the accompanying figures.

DETAILED DESCRIPTION

Figure 1:
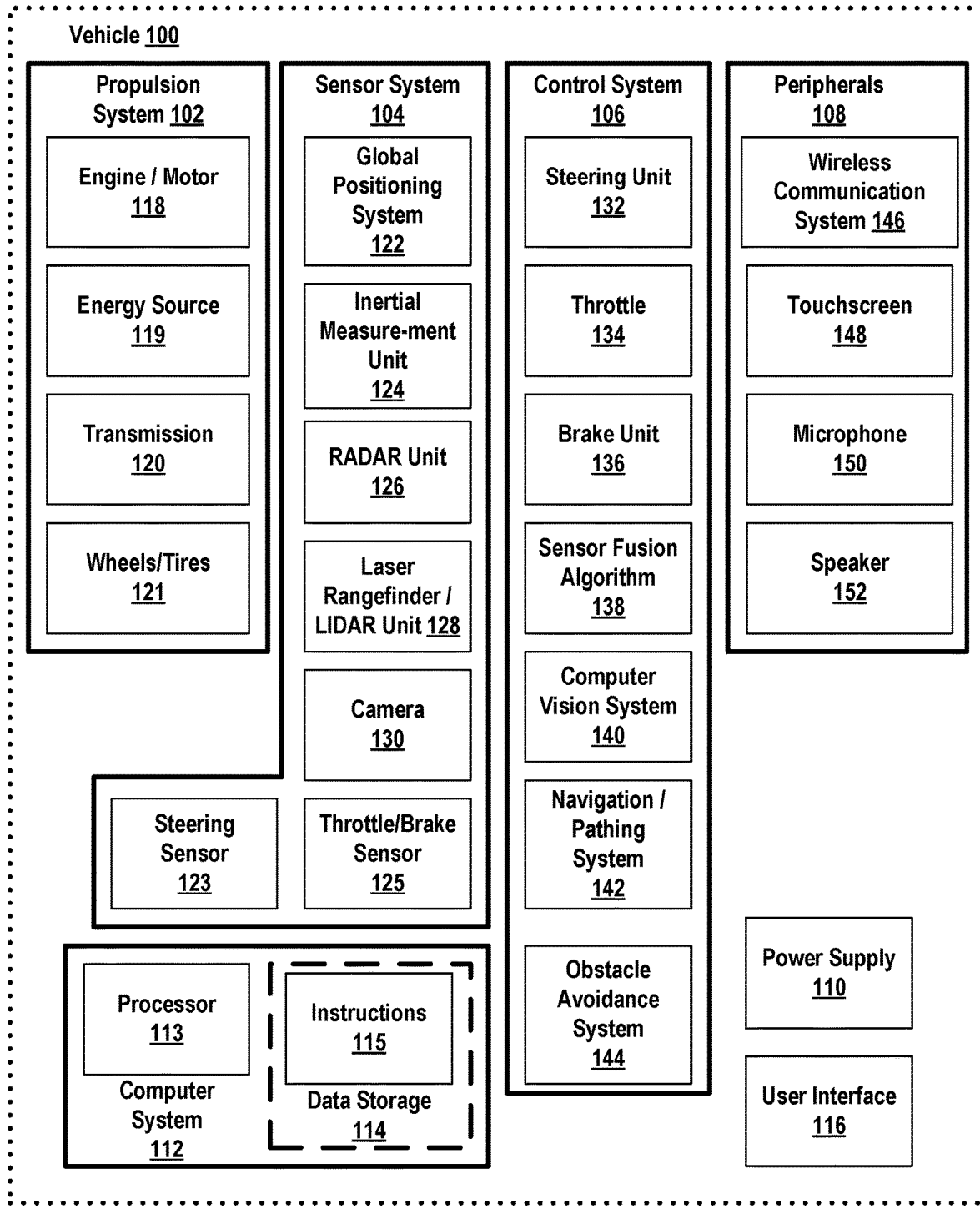
FIG. 1 is a functional block diagram illustrating a vehicle, according to one or more example embodiments.
Figure 2A:
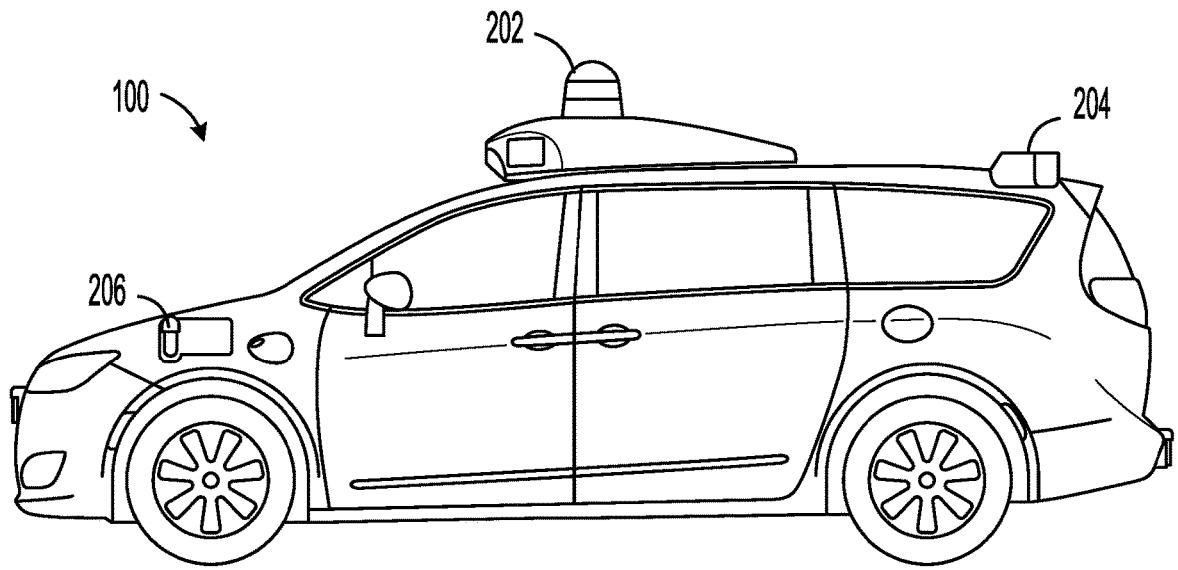
FIG. 2A illustrates a side view of a vehicle, according to one or more example embodiments.
Figure 2B:
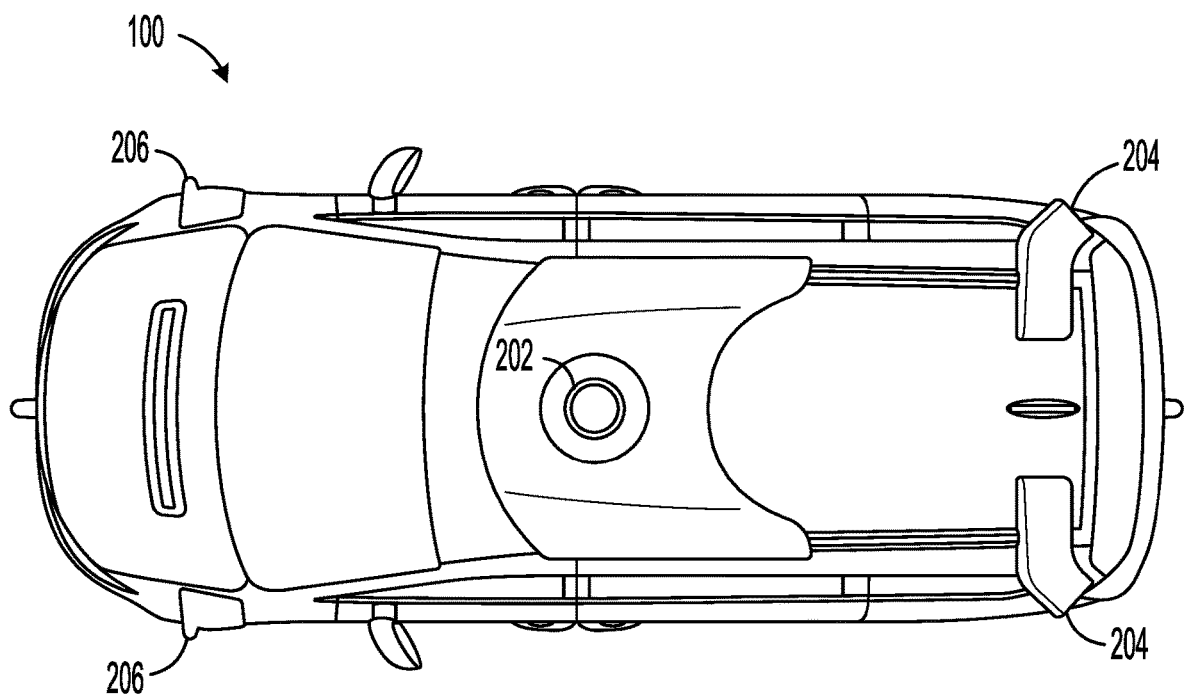
FIG. 2B illustrates a top view of a vehicle, according to one or more example embodiments.
Figure 2C:
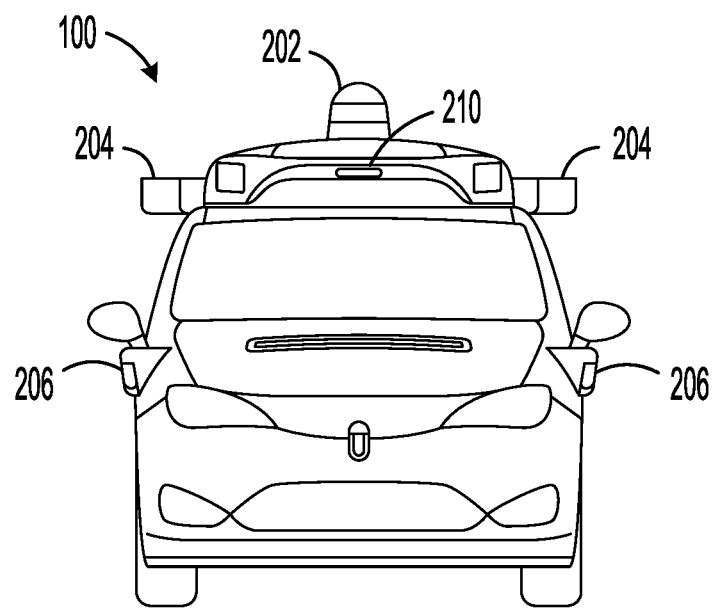
FIG. 2C illustrates a front view of a vehicle, according to one or more example embodiments.
Figure 2D:
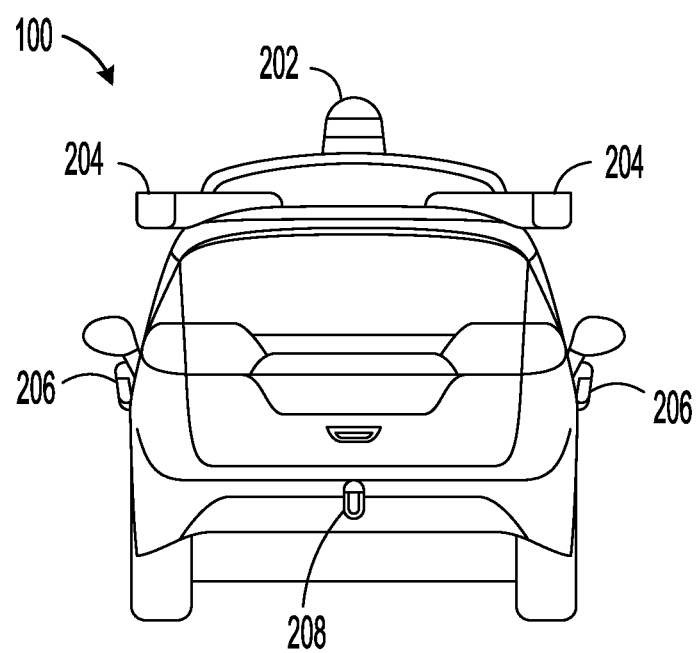
FIG. 2D illustrates a back view of a vehicle, according to one or more example embodiments.
Figure 2E:
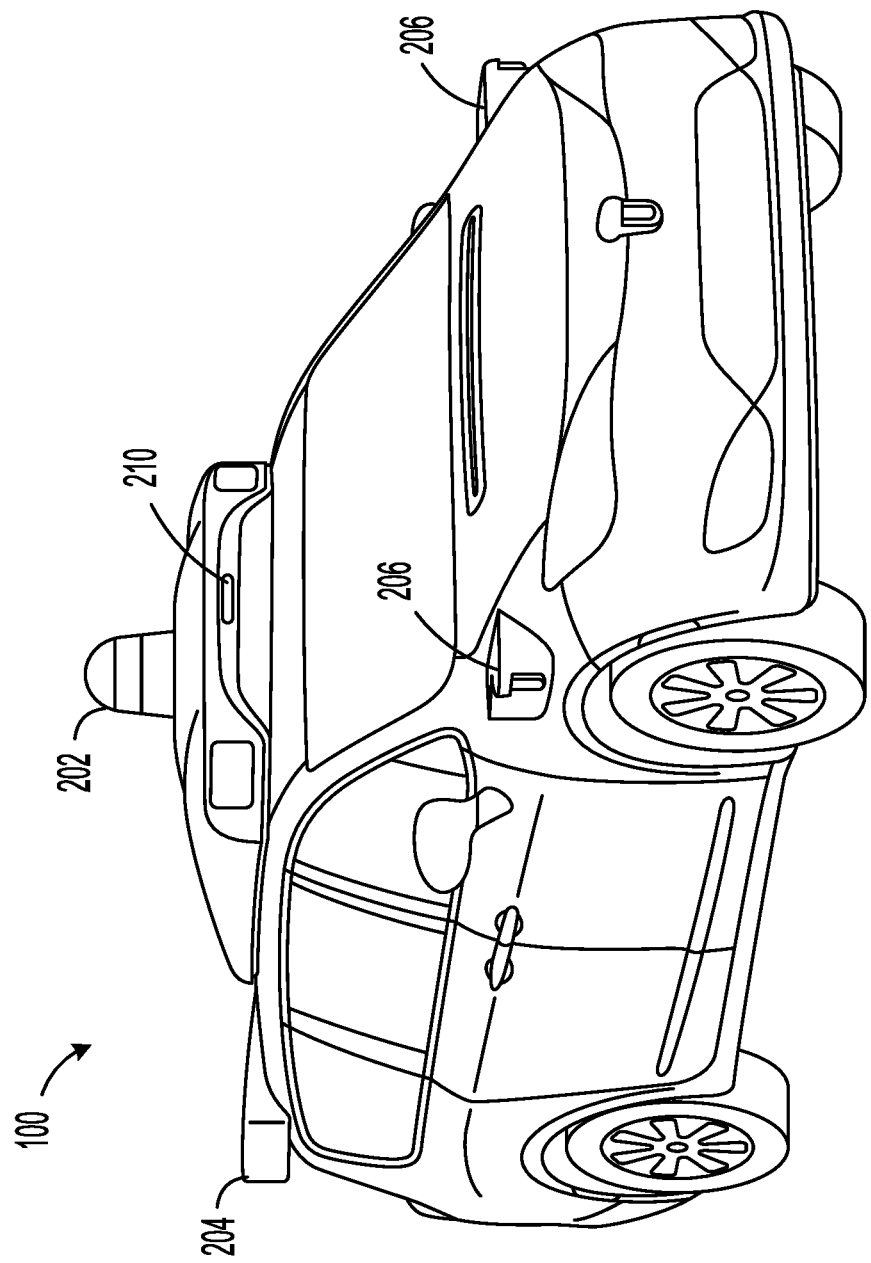
FIG. 2E illustrates an additional view of a vehicle, according to one or more example embodiments.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein. Additionally, in this disclosure, unless otherwise specified and/or unless the particular context clearly dictates otherwise, the terms "a" or "an" means at least one, and the term "the" means the at least one.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

During operation, autonomous vehicles frequently gather information regarding their surroundings and generate data regarding the surroundings using at least one of a lidar, radar, or camera. Information gathered during operation may be gathered to improve the performance of autonomous vehicles, or to catalogue environments for future use. Depending on the length of operation of the autonomous vehicle, the amount of information gathered could reach up to multiple terabytes of data. Typically, this data is transferred from the autonomous vehicle to a central system to be processed. Given the massive amount of data, an infrastructure network might have difficulty efficiently transferring the data to the central system. In some instances, it could take hours to transfer all of it.

One technique for data transfer could be to utilize an Ethernet cable to transfer data from the autonomous vehicle. However, it may take hours to transfer all of the data from the autonomous vehicle using an Ethernet cable. Additionally, wired ports are a security risk for the data. Another technique currently used involves swapping hard disks of data during vehicle charging. When the vehicle returns to a garage from operation to be charged, a technician may switch out the used hard drive for an empty hard drive. The used hard drive may then be taken to remove the data at a different location. The data may be offloaded and then subsequently stored on a cloud-based storage drive. This method of data transfer, however, is time consuming (e.g., can take up to an hour), relies upon the expertise of a technician to perform the swap, is not secure, and is inefficient for an entire fleet of autonomous vehicles.

Described herein are methods and systems that may be used to wirelessly transfer data from an electric or hybrid autonomous vehicle to a cloud-based drive during vehicle charging, thus saving on time. The system may include a high throughput antenna adjacent to a charging port of an autonomous vehicle. The antenna can be a directional antenna. The antenna may be positioned on the charging port of the autonomous vehicle, or in the window of the autonomous vehicle near the charging port. The high throughput antenna may be a signal transmitter configured to transmit the data gathered during operation of the autonomous vehicle to a high throughput antenna positioned on an electrical charging apparatus. In an alternative embodiment, the high throughput antenna on the electrical charging apparatus may transfer data to the high throughput antenna adjacent to the charging port.

During charging, the transmitter and receiver may be in point to point communication. In particular, while a vehicle is being charged, point-to-point communication (e.g., a 60 Gigahertz network) can be used to enable efficient transfer of the large amounts of data to a central system. In alternative embodiments, an optical point-to-point connection is utilized to facilitate close range data transfer to the central system. The transmitter and the receiver may also be separated by a distance up to and including 1.5 meters.

The method may involve engaging a charging port of an autonomous vehicle with an electrical apparatus. The electrical apparatus may be the plug at a charging stall. Once the charging plug is connected to the vehicle, a connection may be established between a signal transmitter of the autonomous vehicle and a signal receiver. As previously mentioned, the signal transmitter may be positioned adjacent to the charging port and the signal receiver may be positioned on the electrical charging apparatus. The method may then involve transferring information from the signal transmitter to the signal receiver for the duration of charging the autonomous vehicle.

At the range of 1 to 1.5 meters, the data could be transferred on a high bandwidth, high throughput, 60 gigahertz network. At this distance and frequency, large amounts of data can be transferred at a fast rate. This type of data transfer may also result in less loss of data during the transfer. By using a focused and directional method for transferring data, multiple autonomous vehicles may use this method and system in adjacent stalls 1.8 meters to 3 meters away. Using a 60 GHz network for data transfer may not clog up the air space, so multiple transfers can be done at once without interfering with each other.

This technique can enable efficient transfer of data since the amount of time needed to transfer the data gathered during a drive may be proportional to the amount of time needed to recharge the autonomous vehicle. In particular, the longer a car drives, the more battery it uses, and the more data it gathers. Performing the charging and the data transfer simultaneously saves time, cuts down on redundancy, and increases security.

Referring now to the figures, FIG. 1 is a functional block diagram illustrating example vehicle 100. Vehicle 100 may represent a vehicle capable of operating fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors (e.g., sensor system 104) to detect and possibly identify objects of the surrounding environment in order to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., $O_2$ monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communications, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radars, LIDARs, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted atop the roof of vehicle 100. Additionally, other mounting locations are possible within examples.

In an example embodiment, data transmitters and receivers may also be positioned on or around the vehicle 100. For instance, as previously discussed, the vehicle may include a high throughput signal transmitter positioned near a charging port of the vehicle and a high throughput signal receiver positioned nearby on an electrical charging apparatus. The high throughput signal transmitter and high throughput signal receiver may be used to transfer data from the autonomous vehicle. The data may be gathered by the sensors on the autonomous vehicle during the autonomous vehicle's operation. The transmitter and receiver may be positioned on or near the components used for charging so that the data transfer could take place during charging.

Figure 3:
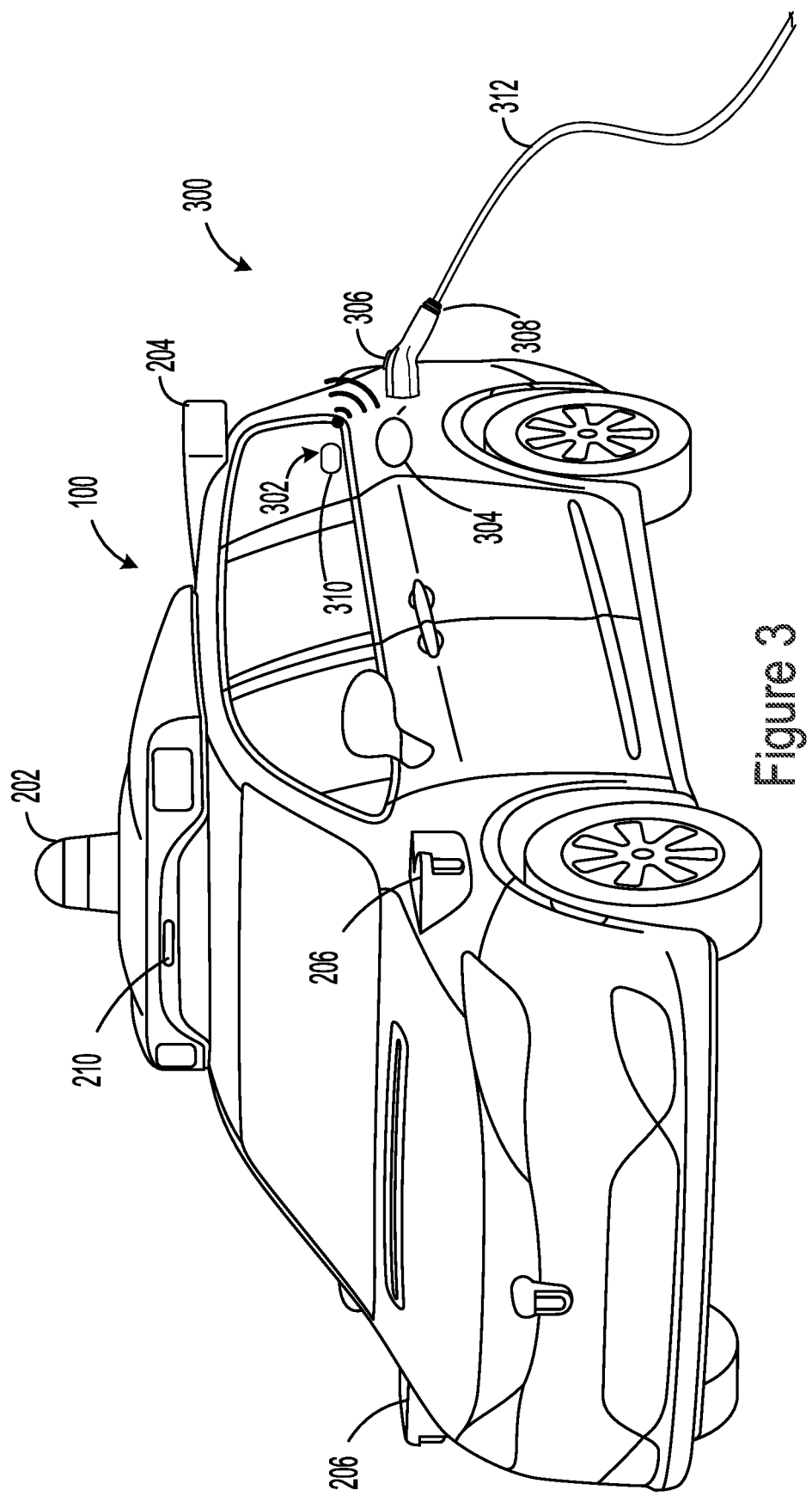
FIG. 3 illustrates a perspective view of a system for wirelessly transferring data, according to one or more example embodiments.

FIG. 3 illustrates a perspective view of a system 300 for wireless data transfer, according to one or more embodiments. As discussed above, the system 300 may include a high throughput signal transmitter 302 adjacent to a charging port 304 of an autonomous vehicle 100. The high throughput signal transmitter 302 could be any transmitter that can wirelessly transmit large amounts of data. For example, the high throughput signal transmitter 302 could be any kind of radio transmitter, or any kind of optical transmitter. The high throughput signal transmitter 302 may be configured to transmit information to a high throughput signal receiver 306. The high throughput signal receiver 306 may be positioned on an electrical charging apparatus 308. Positioning the high throughput signal receiver and transmitter near the charging components, may allow for the data transfer could take place during charging of the autonomous vehicle 100. Further, the high throughput signal transmitter 302 and the high throughput signal receiver 306 may be in point to point communication to facilitate the data transfer. To increase the speed and accuracy of the data transfer and to facilitate wireless spectrum reuse, the high throughput signal transmitter and high throughput signal receiver may be in close range. For example, the high throughput signal transmitter 302 and the high throughput signal receiver 306 may be positioned such that they are separated by a distance up to and including 1.5 meters.

As illustrated in FIG. 3, the high throughput signal transmitter 302 may be positioned on or near the vehicle's charging port 304. The high throughput signal transmitter may, for example, be positioned at a window of the autonomous vehicle. Alternatively, the high throughput signal transmitter could be positioned on the body of vehicle 100, or on the charging port 304. When the charging apparatus 308 is near the charging port 304, the high throughput signal transmitter 302 may begin transferring data to the high throughput signal receiver 306.

In an example embodiment, the point to point communication between the high throughput signal transmitter 302 and the high throughput signal receiver 306 may be radio communication. The data may be transferred from the high throughput signal transmitter 302 to the high throughput signal receiver 306 through radio wave communication. The data could be transferred over a range of frequencies. Specifically, the signal transmitter 302 and signal receiver 306 may operate on frequencies from 3 GHz to 100 GHz. By using frequencies in the microwave to millimeter range, the data transfer may be a short haul high bandwidth and high throughput transfer. Specifically, the data transfer may not interfere with other data transfers. In an example embodiment, the radio communication may be over a 60 GHz network.

Further, in an example embodiment, the high throughput signal transmitter for radio communication may be a patch antenna 310. The patch antenna 310 may be capable of transferring data over a 60 GHz network. Further, the patch antenna may include directionality abilities. The patch antenna 310 may direct data to a specific high throughput signal receiver 306 associated with it so as to not interfere with other data transfers. To assist in directing the data, the system 300 may include a plurality of beam steering antennas in communication with the patch antenna 310 and the high throughput signal receiver 306. The beam steering antennas may be positioned on the vehicle near the patch antenna 310, or on the charging apparatus 308. For example, on the charging apparatus 308, the beam steering antennas may be positioned on the portion of the charging apparatus 308 nearest the vehicle. The beam steering antennas could also be positioned on a cord 312 of the charging apparatus.

In the system 300, data gathered during operation could be stored on a hard drive. The hard drive could be located in the vehicle 100. In order to transfer the data, the data may be sent to a radio and, to prepare the data for transferring, it may be converted into an analog signal. The radio may also be located in the vehicle 100. The radio may be linked to the patch antenna 310 by a low loss cable. In an additional embodiment, the radio can be collocated with an antenna module associated with the patch antenna 310. Alternatively, the radio could transfer the data to the patch antenna 310 over a 1 GHz to 1000 GHz network frequency. In an example embodiment, it could be transferred over an unlicensed band in the 3 GHz to 100 GHz range.

In an alternate example embodiment, the point to point communication between the high throughput signal transmitter 302 and the high throughput signal receiver 306 may be optical communication. Therefore, the data may be transferred in an optical form. In an optical communication embodiment, an optical transceiver may be positioned within the window of the vehicle 100. Further, for optical communication the high throughput signal transmitter 302 and the high throughput signal receiver 306 should be aligned with each other. Therefore, the system may include auto-alignment devices for the high throughput signal transmitter 302 and high throughput signal receiver 306. Optical communication may be short haul as well, so as to not interfere with other data transfers happening nearby.

In an example embodiment, the high throughput signal receiver 306 may be connected to a cloud network. For example, the signal receiver 306 may be directly hard wired to a cloud network. Alternatively, the signal receiver could be hard wired to a server that is in communication with the cloud. Alternatively still, the receiver could wirelessly transmit the data to the cloud network.

Figure 4:
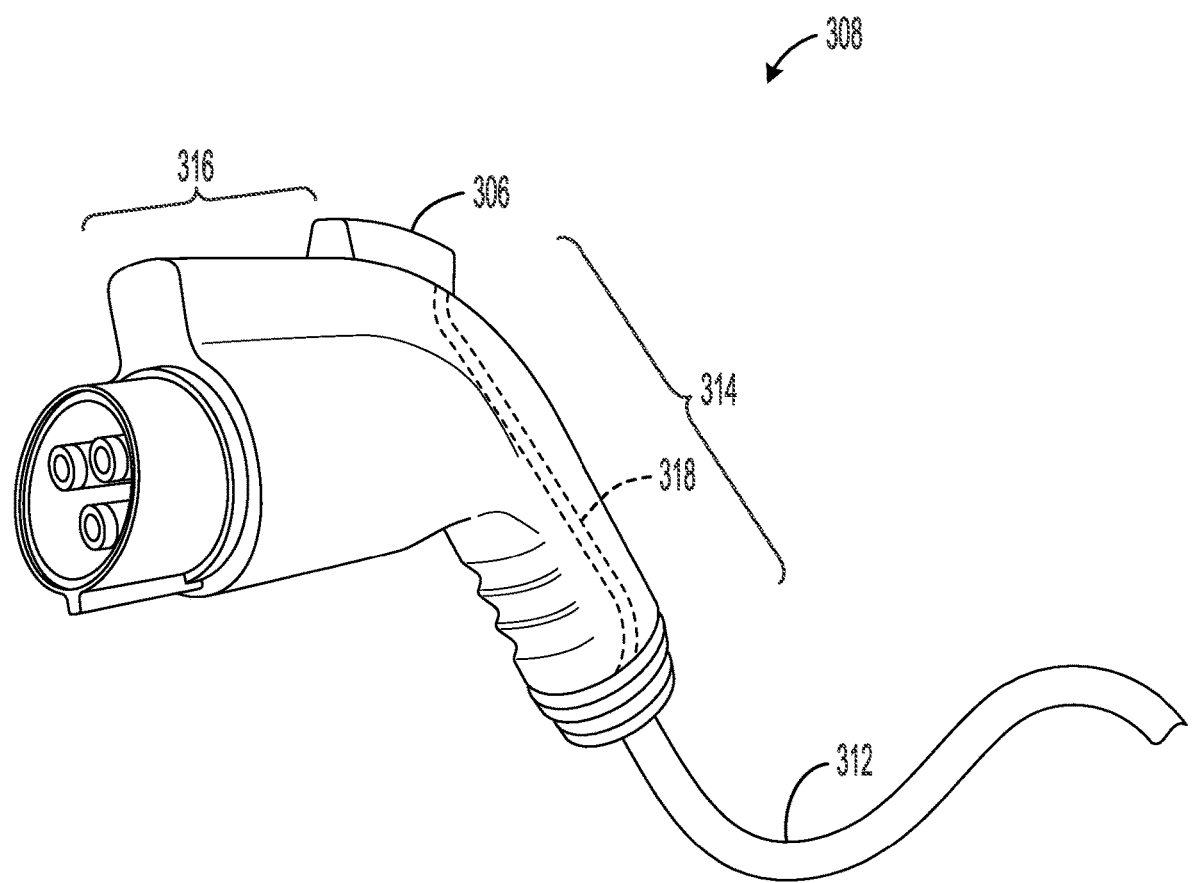
FIG. 4 illustrates a perspective view of a charging jack, according to one or more example embodiments.

FIG. 4 illustrates a perspective view of a charging apparatus 308, according to one or more example embodiments. The charging apparatus 308 may include a handle portion 314 attached to a plug portion 316. The plug portion 316 may be plugged into the vehicle 100 during charging. The handle portion 314 may also be connected to the cord 312. The cord 312 may extend from the charging apparatus 308 to a charging base. Further, the high throughput signal receiver 306 may be positioned on the charging apparatus. FIG. 4 illustrates that the high throughput signal receiver 306 may be positioned on the handle portion 314. Alternatively, the high throughput signal receiver 306 could also be positioned on the plug portion 316, or on the cord 312. The high throughput signal receiver 306 may further include a connecting wire 318 extending from the high throughput signal receiver 306 and progressing through the cord 312. The connecting wire 318 may assist in conveying the data received during the data transfer to the cloud.

As previously discussed, the high throughput signal transmitter 302 and the high throughput signal receiver 306 may be a short distance apart from each other. By placing the high throughput signal transmitter 302 and the high throughput signal receiver 306 a short distance apart, and by using a 60 GHZ network, the data may not clutter the airwaves. This way, multiple data transfers can take place next to each other. In an example embodiment, the distance between the high throughput signal transmitter 302 and the high throughput signal receiver 306 is between 0.9 meters and 1.5 meters. Additionally the close distance may improve the efficiency of large data transfers. In an example embodiment, the high throughput signal transmitter 302 and high throughput receiver 306 transmit at least a terabyte of data. In order to further improve the efficiency of the data transfer, the high throughput signal transmitter 302 and the high throughput signal receiver 306 may be aligned with each other. When aligned, the high throughput signal transmitter 302 and the high throughput signal receiver 306 may be facing each other and may have a short distance straight path between them. High throughput signal transmitter 302 could also comprise a directional antenna. The beam steering antennas, as previously discussed, may also assist in directing the data so as to not interfere with other nearby data transfers.

Figure 5:
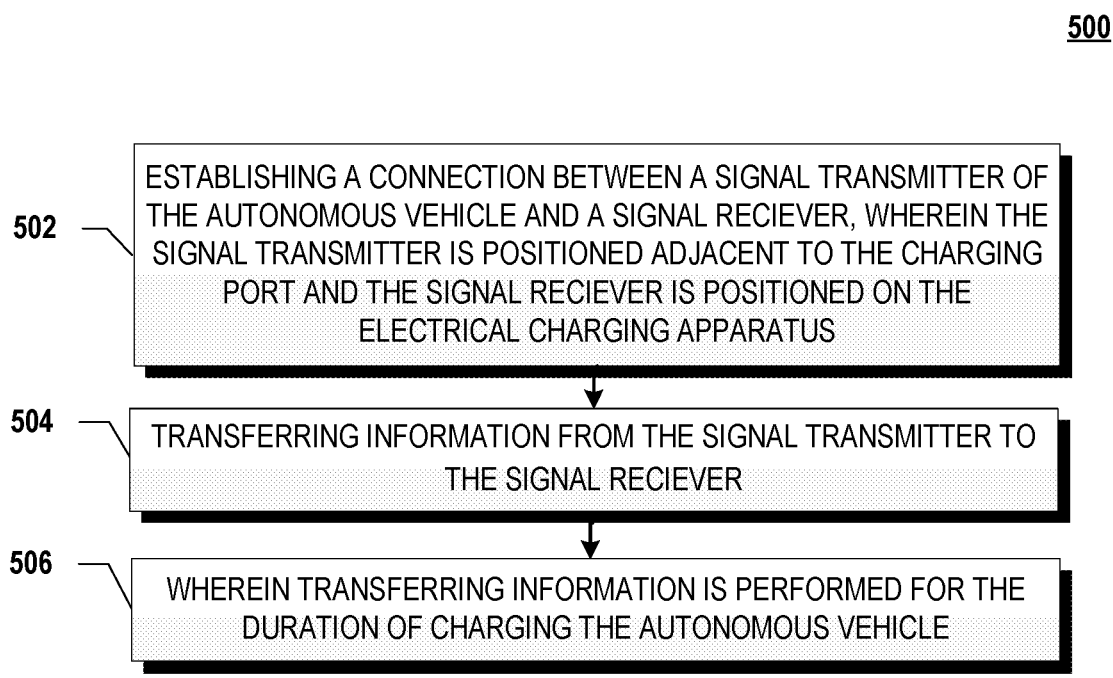
FIG. 5 is a flow chart illustrating a method for wirelessly transferring data, according to one or more example embodiments.

FIG. 5 illustrates a flow chart of operations related to wirelessly transferring data, according to one or more example embodiments. The operations may be used with any of devices 100 or 300. The operations may be carried out by, for example, a controller, or circuitry that is configured to perform the operations.

Once the vehicle returns from operation in the field, it may transfer data gathered during operation, and it may also be charged. Block 502 may involve establishing a connection between a signal transmitter of the autonomous vehicle and a signal receiver, wherein the signal transmitter is positioned adjacent to the charging port and the signal receiver is positioned on the electrical charging apparatus. Upon the vehicle arriving at a charging station, the connection may be automatically established once the signal transmitter and signal receiver are within a threshold distance of each other. Alternatively, the connection may be established after the electrical charging apparatus is plugged into the charging port. Alternatively still, the connection may be established after the electrical charging apparatus is plugged into the charging port of the autonomous vehicle.

Block 504 may involve transferring information from the signal transmitter to the signal receiver. Transferring the information may also happen automatically. The transfer may begin after the connection has been established between the electrical charging apparatus and the charging port. Specifically, the data transfer may begin once charging has started. In an additional embodiment, data can be transferred without charging the vehicle.

Block 506 may involve transferring information that is performed for the duration of charging of the autonomous vehicle. Specifically, the amount of time needed to transfer the data and the amount of time needed to recharge the autonomous vehicle may be proportional. For example, the longer an autonomous vehicle drives, the more battery it uses, and the more data it gathers. Performing the charging and the data transfer simultaneously saves time and cuts down on redundancy. In some embodiments, the information transferred from the autonomous vehicle comprises information gathered during operation of the autonomous vehicle.

Further, in some embodiments, the information gathered during operation of the autonomous vehicle can be multiple terabytes worth of data. The previously disclosed system may attempt to improve the rate of large data transfer. Therefore, in some embodiments, transferring the information gathered during operation may be completed during the charging of the autonomous vehicle.

In some embodiments, as previously mentioned, the connection between the signal transmitter of the autonomous vehicle and the signal receiver is established once the charging of the autonomous vehicle begins. Waiting to establish the connection between the signal transmitter and the signal receiver until the vehicle has been connected to the charging station and is charging may make the data transfer process more secure.

Some embodiments may involve engaging a charging port of an autonomous vehicle with an electrical charging apparatus. A technician may plug the charging apparatus into the vehicle. In some embodiments, engaging a charging port of an autonomous vehicle with an electrical charging apparatus further includes aligning the signal transmitter and the signal receiver. A technician may align the signal transmitter and the signal receiver. Alternatively, the signal transmitter and the signal receiver could be aligned by auto-alignment software.

In some embodiments, transferring information gathered during operation from the signal transmitter to the signal receiver includes a directional aspect, for example directional beam steering. The beam steering may improve the efficiency of the information transfer by preventing information from being lost during transfer. The beam steering can also improve signal-to-noise ratio at the receiver and reduce the stray power that reaches other nearby receivers. Specifically, multiple information transfers may be taking place around 1.8 meters to 3 meters apart in adjacent vehicle stalls. Therefore, the narrowed direction of the information transfer may allow parallel data transfers to occur simultaneously without interfering with each other.

In some embodiments, the distance between the signal transmitter and the signal receiver is between 0.3 meters and 1.5 meters. This means that the information transfer might not have to span more than 1.5 meters. Specifically, in some embodiments, a range of transferring information through air might not extend more than 3 meters. This short haul information transfer may attempt to prevent the airwaves from becoming clogged by signals that may interfere with each other.

Figure 6:
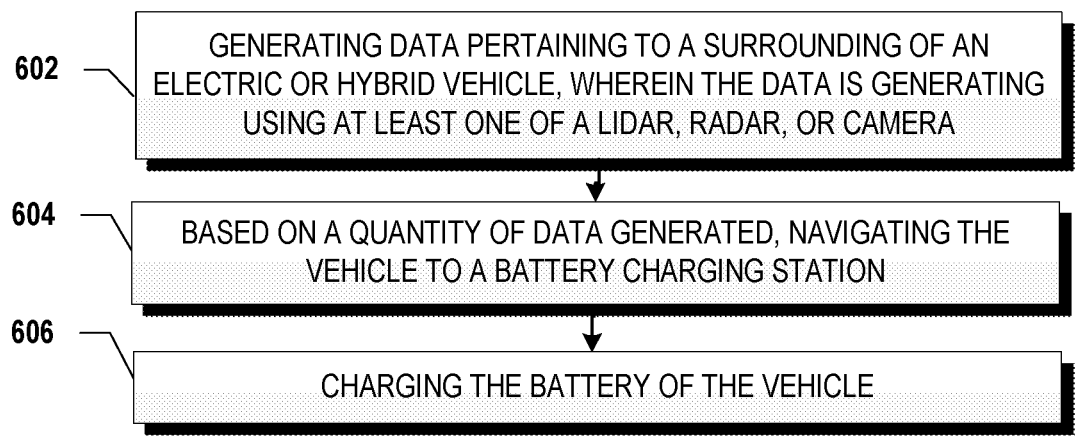
FIG. 6 is a flowchart illustrating a method for operating an electric or hybrid vehicle, according to one or more example embodiments.

FIG. 6 illustrates a flow chart of operations related to operating an electric or hybrid vehicle, according to one or more example embodiments. The operations may be used with any of devices 100 or 300. The operations may be carried out by, for example, a controller, or circuitry that is configured to perform the operations.

Block 602 can involve generating data pertaining to a surrounding of an electric or hybrid vehicle, where the data is generated using at least one of a lidar, radar, or camera. The data can be generated while the electric or hybrid vehicle is in use in the field. For example, the data could pertain to objects in a surrounding environment of the electric vehicle. As an example, the surrounding environment could include an interior or exterior environment, such as inside a building or outside of the building. Additionally or alternatively, the surrounding environment could include an interior environment of a vehicle. Additionally or alternatively, the surrounding environment could include a vicinity around and/or on a roadway. Examples of objects in the surrounding environment include, but are not limited to, other vehicles, traffic signs, pedestrians, roadway surfaces, buildings, terrain, etc.

Block 604 can involve, based on a quantity of data generated, navigating the vehicle to a battery charging station. In an example embodiment, the vehicle may navigate to the battery charging station once the quantity of data has reached a data threshold. The threshold could be any value of multiple terabytes. In an alternative embodiment, a planning algorithm could take into consideration, where the vehicle is, where the demand for transportation is, and where the starting location of the vehicle is, to optimize dynamically in order to determine when to navigate to the battery charging station.

Block 606 can involve charging the battery of the vehicle at the battery charging station. Charging can include engaging a charging port of an autonomous vehicle with an electrical charging apparatus as previously described. In an example embodiment, the vehicle could charge the battery and not transmit the data. However, an alternative embodiment could include transmitting the data from a data signal transmitter of the vehicle to a data signal receiver of the battery charging station. The data could be transmitted simultaneously while the battery is charged. For example, transmitting the data and charging the vehicle can take the same amount of time. Alternately, the data can be transmitted for however long it takes to fully charge the battery of the vehicle, and once the vehicle is done charging, the rest of the data can be stored to transmit at a later time.

Figure 7:
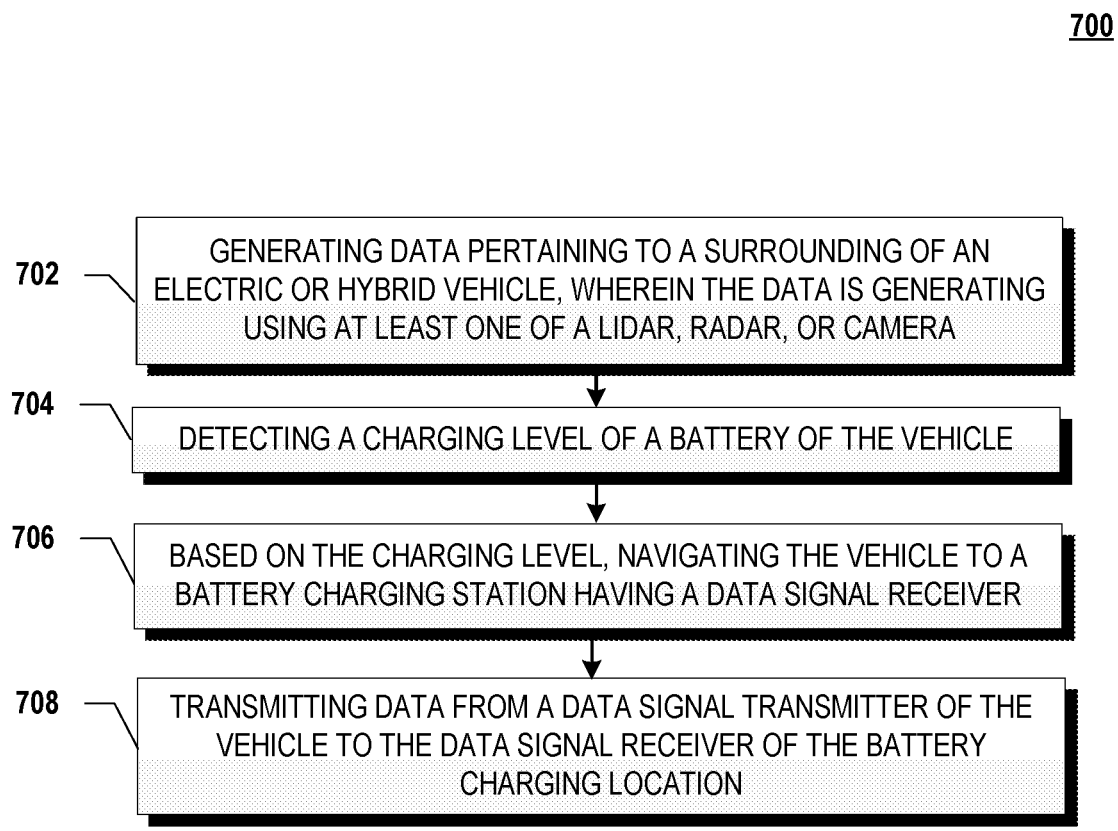
FIG. 7 is a flowchart illustrating a method for operating an electric or hybrid vehicle, according to one or more example embodiments.

FIG. 7 illustrates a flow chart of operations related to operating an electric or hybrid vehicle, according to one or more example embodiments. The operations may be used with any of devices 100 or 300. The operations may be carried out by, for example, a controller, or circuitry that is configured to perform the operations.

Block 702 can involve generating data pertaining to a surrounding of an electric or hybrid vehicle, where the data is generated using at least one of a lidar, radar, or camera. The data can be generated in the manner previously discussed in block 602. Particularly the data could pertain to objects in a surrounding environment of the electric vehicle.

Block 704 can include detecting a charging level of a battery of the vehicle. As the vehicle is operating in the field, the charging level of the battery will decrease. The vehicle can monitor the level of charge on the battery vehicle.

Block 706 can include, based on the charging level, navigating the vehicle to a battery charging station having a data signal receiver. In an example embodiment, the vehicle may navigate to a battery charging station having a data signal receiver when it determines the charging level is below a charge threshold. The threshold can vary depending on distance from a battery charging station. For example, the closer the vehicle is to a battery charging station, the lower the threshold can be before the vehicle should navigate back to the battery charging station. However, the farther the vehicle is to a battery charging station, the higher the threshold must be in order for the vehicle to make it back to the battery charging station. The threshold can also vary depending on an external temperature of the vehicle. For example, in extremely low and extremely high temperatures the battery may lose charge more quickly. Thus, the charge threshold can be higher for navigating the vehicle to a charging station.

In an alternative embodiment, a demand planning algorithm can take into consideration the temperature, where the vehicle is, where the demand for transportation is, and where the starting location of the vehicle is, to optimize dynamically in order to determine when to navigate to the battery charging station with a data signal receiver. For example, if the vehicle is on one side of a hill, and it needs to climb the hill to get to a charging station having a data signal receiver, the vehicle may need more charge than other times. The threshold may be set dynamically in this way.

An additional embodiment of method 700 can include determining if the battery of the vehicle has been charged over a threshold amount of times without transmitting data, and navigating the vehicle to a battery charging station having a data signal receiver. For example, it is possible for the vehicle to be charged at a battery charging station that does not have a data signal receiver. However, the vehicle will continue to gather and store data, without having the opportunity to offload it. Therefore, once the vehicle has been charged a threshold number of times without transmitting data, it will navigate to a battery charging station having a data signal receiver.

Block 708 can involve transmitting data from a data signal transmitter of the vehicle to the data signal receiver of the battery charging location. As previously mentioned, beam steering can be used while transmitting the data from the transmitter to the receiver. In an example embodiment, the data can be transmitted without charging the battery of the vehicle. Specifically, the vehicle can transmit the data at an optimized data only transfer station. Alternatively, the method can include charging the battery of the vehicle. Specifically, the data can be transmitted from the data signal transmitter of the vehicle to the data signal receiver of the battery charging station simultaneously while charging the battery of the vehicle. Alternately, the data can be transmitted for however long it takes to fully charge the battery of the vehicle, and once the vehicle is done charging, the rest of the data can be stored to transmit at a later time.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A system comprising:
   a signal transmitter positioned either (i) on a charging port of an autonomous vehicle, or (ii) in a window of the autonomous vehicle within 3 meters of the charging port, wherein the signal transmitter is configured to transmit information to a signal receiver, wherein the signal transmitter comprises a patch antenna;
   the signal receiver positioned on an electrical charging apparatus, wherein the electrical charging apparatus comprises a plug portion;
   wherein the plug portion is plugged into the charging port of the autonomous vehicle when the autonomous vehicle is charging and when so charging:
     the signal transmitter and the signal receiver are in point to point communication, wherein the point to point communication between the signal transmitter and the signal receiver comprises radio communication; and
     the signal transmitter and the signal receiver are separated by a distance up to and including 1.5 meters; and
   a plurality of beam steering antennas in communication with the signal transmitter and the signal receiver, wherein at least one of the plurality of beam steering antennas is positioned on the autonomous vehicle.

2. The system of claim 1, wherein the radio communication is over a 60 GHz network.

3. The system of claim 1, wherein the patch antenna is linked to a radio by a low loss cable.

4. The system of claim 1, wherein the point to point communication between the signal transmitter and the signal receiver is optical communication.

5. The system of claim 1, wherein the signal receiver is connected to a cloud network.

6. The system of claim 1, wherein the distance between the signal transmitter and the signal receiver is between 0.3 meters and 1.5 meters.

7. The system of claim 1, wherein the signal transmitter and receiver transmit at least a terabyte of data.

8. The system of claim 1, wherein the distance between the signal transmitter and the signal receiver is less than 0.3 meters.

9. The system of claim 1, wherein the radio communication is over a network between frequencies of 1 GHz and 60 GHz.

10. The system of claim 1, wherein the radio communication is over a network between frequencies of 60 GHz and 1000 GHz.

11. The system of claim 1, wherein the electrical charging apparatus further comprises a handle portion, wherein the plug portion is attached to the handle portion.

12. The system of claim 11, wherein the signal receiver is positioned on the handle portion.

13. The system of claim 11, wherein the electrical charging apparatus further comprises a cord, wherein the cord is connected to the handle portion.

14. The system of claim 13, wherein the signal receiver is positioned on the cord.

* * * * *